US012651082B2

(12) United States Patent
Kotra et al.

(10) Patent No.: US 12,651,082 B2
(45) Date of Patent: Jun. 9, 2026

(54) GRAPH OBJECT STORAGE AND ACCESS CONTROL SYSTEM AND METHOD

(71) Applicant: ADVANCED MICRO DEVICES, INC., Santa Clara, CA (US)

(72) Inventors: Jagadish B. Kotra, Austin, TX (US); David Kaplan, Austin, TX (US); Kishore Punniyamurthy, Austin, TX (US); Alexander Toufic Freij, Santa Clara, CA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 204 days.

(21) Appl. No.: 18/212,858

(22) Filed: Jun. 22, 2023

(65) Prior Publication Data

US 2024/0193292 A1 Jun. 13, 2024

Related U.S. Application Data

(60) Provisional application No. 63/432,186, filed on Dec. 13, 2022.

(51) Int. Cl.
*G06F 21/62* (2013.01)
*G06F 21/79* (2013.01)
*G06F 21/80* (2013.01)

(52) U.S. Cl.
CPC .. *G06F 21/6218* (2013.01); *G06F 2221/2113* (2013.01); *G06F 2221/2141* (2013.01)

(58) Field of Classification Search
None
See application file for complete search history.

(56) References Cited

U.S. PATENT DOCUMENTS

| | | | | |
|---|---|---|---|---|
| 6,061,763 A * | 5/2000 | Rubin | ............... | G06F 12/0866 |
| | | | | 711/E12.019 |
| 9,274,954 B1 * | 3/2016 | Bairavasundaram | ....................... | |
| | | | | G06F 11/1076 |
| 9,652,291 B2 * | 5/2017 | Biswal | ............... | G06F 12/1009 |
| 2002/0156792 A1 * | 10/2002 | Gombocz | .............. | G06F 16/20 |
| 2005/0086188 A1 * | 4/2005 | Hillis | ...................... | G09B 5/00 |
| | | | | 706/50 |
| 2012/0030242 A1 * | 2/2012 | Nakamura | .......... | G06F 21/6218 |
| | | | | 707/E17.032 |
| 2017/0060389 A1 * | 3/2017 | Thapliyal | ............ | G06F 3/04842 |

(Continued)

FOREIGN PATENT DOCUMENTS

CN        101247417 A   *   8/2008

OTHER PUBLICATIONS

Fast Iterative Graph Computation: A Path Centric Approach. Yuan. IEEE. (Year: 2014).*

(Continued)

*Primary Examiner* — Venkat Perungavoor

(57) ABSTRACT

A processing system receives graph object data and graph object metadata. The processing system stores the graph object metadata inline with the graph object data. The graph object metadata indicates access permissions for corresponding graph objects. Because the graph object metadata is stored inline with the graph object data, the graph object metadata is more easily retrieved and fewer system resources are consumed to determine access permissions of a requester as compared to a system where graph object metadata is stored separately from the graph object data.

20 Claims, 5 Drawing Sheets

(56) References Cited

U.S. PATENT DOCUMENTS

| | | | | |
|---|---|---|---|---|
| 2020/0019718 A1 * | 1/2020 | Lin | ..................... | H04L 63/105 |
| 2021/0240616 A1 * | 8/2021 | Stabrawa | ............ | G06F 12/0646 |
| 2024/0086095 A1 * | 3/2024 | Xu | ......................... | G06F 3/061 |

OTHER PUBLICATIONS

Harrod, William, "AGILE—Advanced Graphic Intelligence Logical Computing Environment," IARPA—Intelligence Advanced Research Projects Activity, Office of the Director of National Intelligence, <https://www.iarpa.gov/research-programs/agile> Accessed Dec. 9, 2022, 4 pages.

Watson et al., "An Introduction to Cheri," University of Cambridge Computer Laboratory, Technical Report No. 941, 2019, 43 pages.

Weijiang, Yang. "[Patch v12 01/11] Documentation: Add EPT based Subpage Protection and related APIs," 2020, <https://lkml.org/lkml/2020/5/16/160>, Accessed Dec. 9, 2022, 4 pages.

Intel, "Intel® 64 and IA-32 Architectures Software Developer Manuals," <https://www.intel.com/content/www/us/en/developer/articles/technical/intel-sdm.html>, Accessed Dec. 9, 2022, 4 pages.

* cited by examiner

PROCESSING SYSTEM
100

PROCESSING CIRCUIT
104

CACHE MEMORY
118

PROCESSING CIRCUIT
106

CACHE MEMORY
120

TRANSPORT 122

OTHER NODE
126

I/O AGENT
124

MEMORY
CONTROLLER
108

DATA FABRIC
102

I/O HUB
110

I/O
114

I/O
116

SYSTEM MEMORY
112

400

402 — RECEIVE GRAPH OBJECT DATA

404 — RECEIVE GRAPH OBJECT ACCESS CONTROL METADATA

406 — SEPARATE GRAPH OBJECT ACCESS CONTROL METADATA BASED ON CORRESPONDING GRAPH OBJECTS

408 — STORE GRAPH OBJECT DATA AT CACHE LINE

410 — STORE GRAPH OBJECT ACCESS CONTROL METADATA INLINE AT CACHE LINE OF CORRESPONDING GRAPH OBJECT DATA

500

502  RECEIVE REQUEST FOR GRAPH OBJECT DATA

504  RETRIEVE GRAPH OBJECT DATA

506  RETRIEVE CORRESPONDING GRAPH OBJECT ACCESS CONTROL METADATA BUT EXCLUDING OTHER GRAPH OBJECT ACCESS CONTROL METADATA

508  DETERMINE WHETHER TO GRANT ACCESS TO GRAPH OBJECT DATA BASED ON CORRESPONDING GRAPH OBJECT ACCESS CONTROL METADATA

GRAPH OBJECT STORAGE AND ACCESS CONTROL SYSTEM AND METHOD

This invention was made with Government support under Contract No. W911NF-22-C-0085 awarded by the Army Research Office and IARPA. The Government has certain rights in the invention.

BACKGROUND

Data capturing interactions or relationships between entities is often represented as graphs, where the entities are represented as graph objects and relationships are used to connect the graph objects. The graph objects are stored in a computer memory as a plurality of files. Access to the graph objects is controlled using access control metadata stored at the computer memory that indicates which entities have permission to access or modify which graph objects.

BRIEF DESCRIPTION OF THE DRAWINGS

The present disclosure is better understood, and its numerous features and advantages made apparent to those skilled in the art, by referencing the accompanying drawings. The use of the same reference symbols in different drawings indicates similar or identical items.

DETAILED DESCRIPTION

Figure 1:
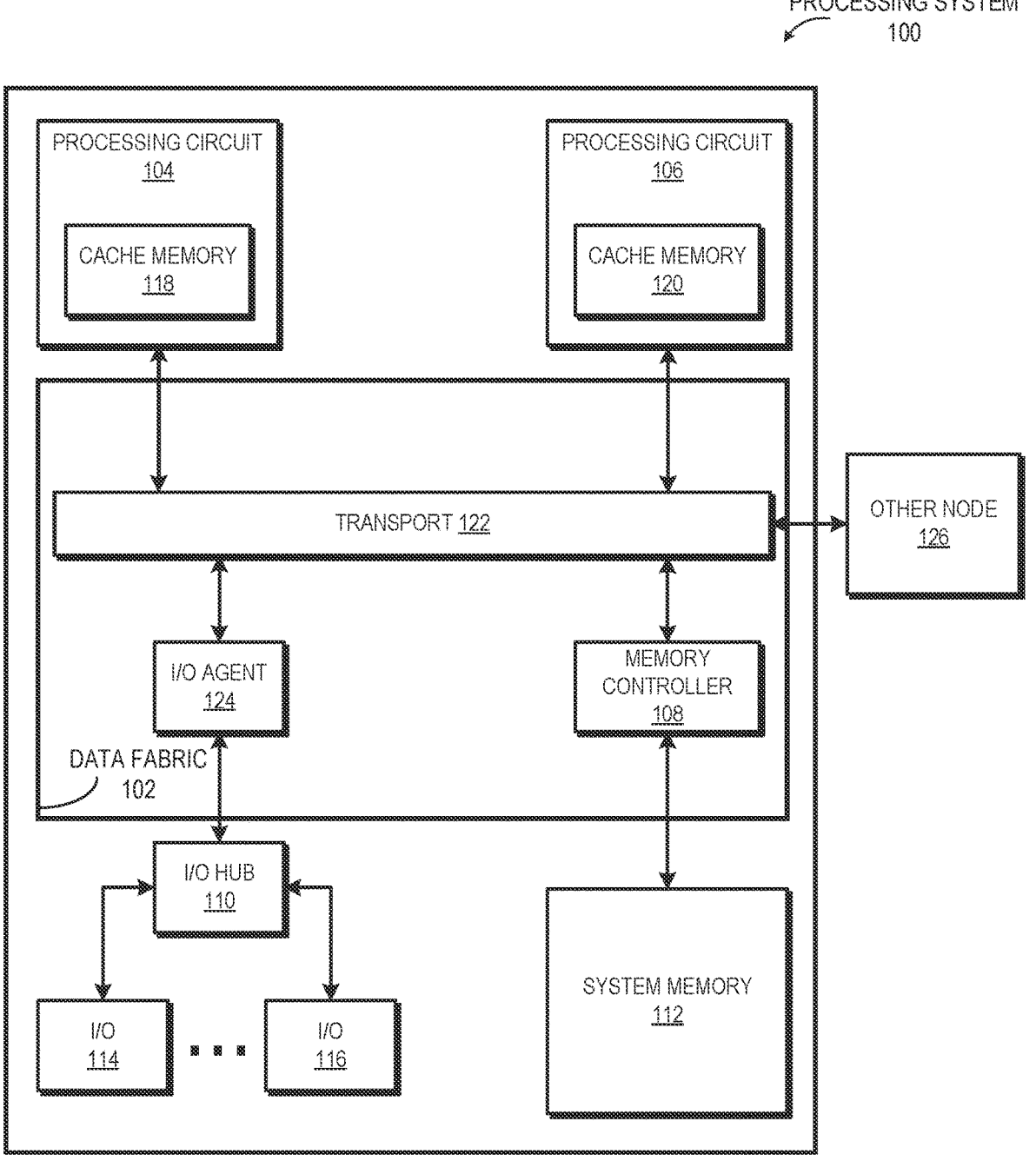
FIG. 1 is a block diagram of a processing system that includes a graph object storage and access control system in accordance with some implementations.

Controlling access to graph objects is difficult. Because the graph objects are generally smaller than a memory page, multiple graph objects are addressed together on a single memory page (e.g., 4-bit graph objects in a 4 kilobyte memory page). In such systems, which use constructs such as page tables to manage access, access control is performed at page granularity. Accordingly, users are granted access to every graph object within a page or none of the graph objects in the page. If a user should have permission to access a first graph object within a page but not a second graph object within the page, the user is either improperly granted or denied access to the entire page.

Further, managing access control metadata in such systems is inefficient. The graph objects are stored collectively and the access control metadata is also stored collectively in a group of addresses collectively succeeding the addresses of the collective group of graph objects. To determine whether a user has permission to access a graph object, the access control metadata for every graph object for that user or an associated permission group of the user is retrieved. In systems that include more graph objects than users or permission groups, retrieving the access control metadata consumes an undesirable amount of memory capacity and bandwidth. Additionally, searching for the permissions for that specific graph object within the graph object metadata consumes an undesirable amount of processing time.

A processing system receives graph object metadata (e.g., access control metadata such as an access control list including read and write permissions) corresponding to respective graph objects (e.g., entities such as humans in a social/professional network, web objects on the internet, consumer products in a recommendation system, etc.) and stores the graph object metadata inline at respective cache lines of a cache memory with the corresponding graph objects. The graph object metadata indicates access permissions for users or user groups for corresponding graph objects such as read access permissions, write access permissions, or both. The processing system includes more graph objects than users. In response to a request to access a graph object, the processing system retrieves the corresponding graph object metadata but excluding graph object metadata corresponding to other graph objects.

As a result, the processing system maintains access permissions with a cache line granularity, as compared to a system that determines access permissions based on memory pages. Further, the processing system performs fewer fetches from the cache memory as compared to a system that does not store the graph object metadata inline at the cache lines. Additionally, the processing system fetches and searches through less access permission data to determine the access permissions, as compared to a system that does not store the graph object metadata inline at the cache lines.

As used herein, first data being stored "inline" at a memory device with second data refers to an arrangement where the first data and the second data are both stored simultaneously at that memory device. For example, if metadata is stored "inline" at a cache line with a graph object, then the cache line stores both the metadata and the graph object. Such language does not exclude other data also being stored at the memory device. Further, such language does not require that the first data be stored adjacent to the second data as long as the specified memory device stores both the first data and the second data.

As used herein, "excluding" data refers to a variety of potential actions including not retrieving the data, omitting the data, or otherwise filtering out the data. For example, if a system retrieves first data but "excludes" other data, the first data is retrieved and a variety of actions are contemplated regarding the other data including not retrieving the other data, omitting the other data, or otherwise filtering out the other data.

The techniques described herein are, in different implementations, employed using any of a variety of parallel processors (e.g., vector processors, graphics processing units (GPUs), general-purpose GPUs (GPGPUs), non-scalar processors, highly-parallel processors, artificial intelligence (AI) processors, inference engines, machine learning processors, other multithreaded processing units, and the like). For ease of illustration, reference is made herein to example systems and methods in which processing circuits are employed. However, it will be understood that the systems and techniques described herein apply equally to the use of other types of parallel processors unless otherwise noted.

FIG. 1 illustrates a processing system 100 that stores graph objects and controls access to the graph objects in accordance with at least some implementations. The processing system 100 includes a data fabric 102 used to interconnect various components of processing system 100, including a plurality of processing circuits, such as processing circuits 104-106, one or more memory controllers 108, and one or more I/O hubs 110. Each memory controller 108 is coupled to one or more memory devices such as system memory 112, and each I/O hub 110 is in turn coupled to one or more I/O devices, such as I/O device 114 or I/O device 116.

Processing circuits 104-106 include one or more processor cores and a local cache memory. In the illustrated implementation, processing circuit 104 includes cache memory 118 and processing circuit 106 includes cache memory 120. In some implementations, cache memories 118-120 store graph object metadata (e.g., access control metadata) inline with corresponding graph object data. The processor cores include, for example, CPU cores, GPU cores, DSP cores, parallel processor cores, or a combination thereof. The local cache memory of a processing client includes one or more levels of cache, which include respective cache lines configured to store cache data. In some implementations, processing circuits 104-106 separate received graph object data, received graph object metadata, or both and store the graph object data and graph object metadata at the respective local cache memory. In some implementations, at least one of processing circuits 104-106 differs from at least one other of processing circuits 104-106 (i.e., processing circuits 104-106 are heterogeneous). In other implementations, processing circuits 104-106 are homogeneous.

Memory controller 108 operates as an interface between the corresponding system memory 112 and the other components of processing system 100. Cache data is accessed from system memory 112 by memory controller 108 in response to access requests from a processing circuit, and the cache data is stored, or cached, in cache memory of the processing circuit. When cache data containing modified data is evicted from a cache memory of a processing circuit, and thus needs to be updated in system memory 112, memory controller 108 manages this write-back process. In some implementations, processing system 100 includes multiple system memories 112.

I/O devices 114-116 operate to transfer data into and out of processing system 100 using DMA access operations. For example, in some implementations, one of I/O devices 114-116 includes a network interface card (NIC) for connecting the node to a network for receiving and transmitting data, or hard disk drive (HDD) or other mass storage device for non-volatile storage of relatively large quantities of data for use by processing circuits 104-106, and the like. In at least one implementation, I/O hub 110 manages I/O devices 114-116 and serves as an interface between data fabric 102 and I/O devices 114-116. To illustrate, in some implementations, I/O hub 110 includes a Peripheral Component Interconnect Express (PCIe) root complex so as to operate as a PCIe interconnect between I/O devices 114-116 and data fabric 102.

Data fabric 102 transports commands, data, requests, status communications, and other signaling among the other components of processing system 100, and between processing system 100 and other nodes 126. One such subset of these transport operations is the storage of data provided by the I/O devices 114-116 at system memory 112 for use by one or more of processing circuits 104-106. I/O agent 124 operates as a coherent agent for I/O hub 110 and I/O devices 114-116. Further, in some implementations, transport layer 122 is coupled to the corresponding transport layer of one or more other nodes 126 or to processing circuits 104-106 via one or more bridge components or coherent agents (not shown). In various implementations, data fabric 102 is compatible with one or more standardized interconnect specifications, such as a HyperTransport™ specification or an Infinity Fabric™ specification.

Figure 2:
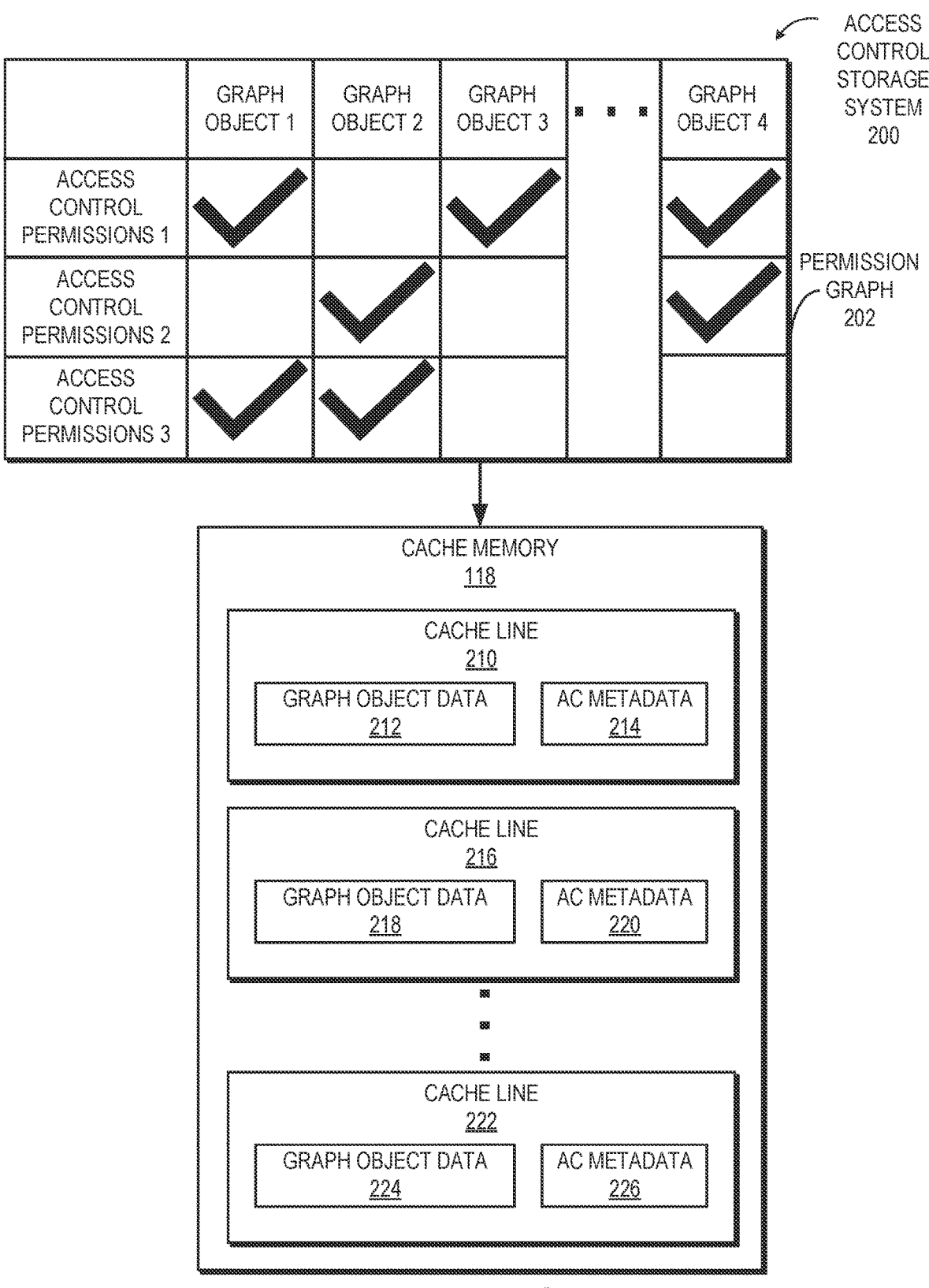
FIG. 2 is a block diagram of an access control storage system in accordance with some implementations.

FIG. 2 is a block diagram illustrating an access control storage system 200 that controls access to graph objects in accordance with some implementations. In the illustrated implementation, access control storage system 200 includes at least a subset of processing system 100. In other implementations, access control storage system 200 corresponds to a different processing system that includes additional or fewer components than processing system 100. In the illustrated implementation, access control storage system 200 includes cache memory 118. Access control storage system 200 additionally shows an example permission graph 202 for explanatory purposes. Cache memory 118 includes cache lines 210, 216, and 222, which store respective graph object data 212, 218, and 224 and respective access control metadata 214, 220, and 226.

Permission graph 202 shows an example of sets of access control permissions which include permission values that indicate whether a user, group of users, clearance level, role, etc. is to be permitted access to various graph objects. For example, a user having access control permissions 2 would be granted access to graph objects 2 and 4 but not to graph objects 1 and 3. In some implementations, permission graph 202 is specific to a certain type of access (e.g., read access) and a second permission graph (not shown) is specific to another type of access (e.g., write access). In some implementations, a quantity of access control permissions is less than a quantity of graph objects. For example, in the illustrated example, there are three sets of access control permissions and more sets of graph objects (e.g., ten graph objects, five hundred graph objects, or billions of graph objects). As a result, if all of the access permissions for a single graph object were retrieved (e.g., data representing a single column in permission graph 202), less data would be retrieved than if all of the access permissions for a set of access control permissions (e.g., data representing a single row of permission graph 202) were retrieved, reducing overall system bandwidth and memory usage consumption. Further, searching the retrieved access permissions takes less time on average if all the access permissions for a single graph object are searched unless an address for the permission to access the desired graph object is provided.

As a result, in the illustrated implementation, access control metadata is separated based on corresponding graph objects and stored inline at cache memory 118 in cache lines with the corresponding graph objects. For example, as further described below with reference to FIG. 4, graph object data for graph object 1 of permission graph 202 is stored at graph object data 212 of cache line 210 and the corresponding access control metadata, which is illustrated as the column below graph object 1 in permission graph 202, is stored access control metadata 214. Further, graph object data for graph object 2 of permission graph 202 is stored at graph object data 218 of cache line 216 and the corresponding access control metadata, which is illustrated as the column below graph object 2 in permission graph 202, is stored access control metadata 220. Subsequently, as further described below with reference to FIG. 5, when a request to retrieve graph object 1 is received, graph object data 212 and access control metadata 214 are retrieved but graph object data 218 and access control metadata 220 are excluded. As a result, in the example, less data (three sets of access control permission indications) is retrieved from cache memory 118 and is searched to verify whether a requester has permission to access graph object 1, as compared to a system where the requester identifies their access control permissions (e.g., access control permissions 3) and the row of access control permissions 3 is retrieved and searched to verify whether the requester has permission to access graph object 1. Because cache lines 210, 216, and 222 store both graph object data and access control metadata, in some implementations, cache lines 210, 216, and 222 are designed differently, as compared to a system that stores access control metadata in a series of memory locations separate from the respective graph object data. In particular, in some cases, cache lines 210, 216, and 222 store more data, additional routing hardware is included to ensure that access control metadata is correctly stored and retrieved, or as further discussed below with reference to FIG. 5, additional hardware is included to enable speculative fetching of access control metadata. In some implementations, cache lines 210, 216, and 222 store multiple sets of access control metadata. For example, cache line 216 stores graph object data 218, access control metadata 220 (e.g., access control metadata indicating read permissions), and a second set of access control metadata (e.g., access control metadata indicating write permissions). In some implementations, a retrieved graph object shares a memory page with a graph object that is excluded. Further, in some implementations, retrieved metadata shares a memory page with metadata that is excluded.

As a result of storing the graph object data (e.g., graph object data 224) and corresponding graph object metadata (e.g., access control metadata 226) together in a cache line (e.g., cache line 222) inline, various benefits are realized as compared to a system that stores graph object metadata collectively in a series of memory locations separate from the respective graph object data. As noted above, in some cases, less data is retrieved, and less communication bandwidth is used to verify whether a requester has permission to access a graph object. In some cases, in the system that stores the graph object metadata collectively, the graph object metadata is retrieved separately via a separate memory access, which includes performing additional actions such as an address translation for the separate memory access. Therefore, fewer memory accesses are performed if the graph object data is stored inline because the graph object data and the graph object metadata are retrieved together due to locality. Further, because the graph object metadata is smaller than a cache line, in some cases, cache pollution is alleviated when the graph object metadata is stored inline with the graph object data, as compared to being stored and retrieved separately. In some cases, offloading graph object data and graph object metadata to graph accelerators is more programmer transparent when the graph object metadata is stored inline with the graph object metadata, as compared to when the graph object metadata is stored separate from the corresponding graph object data. In some implementations, Processing In Memory (PIM) systems can more easily verify access control permissions prior to performing computation when access control metadata is stored inline, as compared to systems where the access control metadata is stored separately and the PIM system is notified of access control permissions for a requester.

Figure 3:
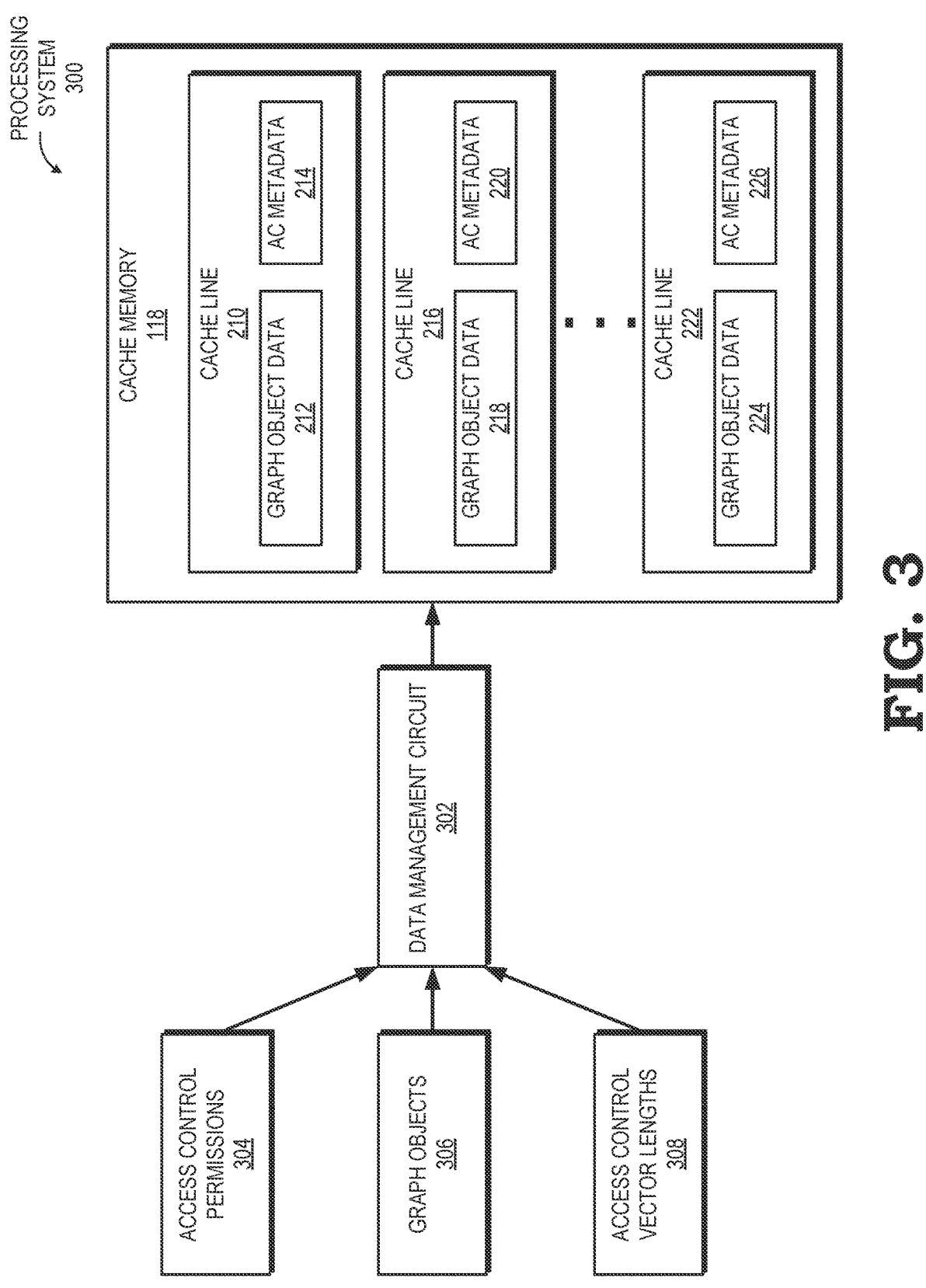
FIG. 3 is a block diagram of a processing system that includes a graph object storage system in accordance with some implementations.

FIG. 3 is a block diagram illustrating a processing system 300 that is used to control access to graph objects in accordance with some implementations. In the illustrated implementation, processing system 300 includes at least a subset of processing system 100. In other implementations, processing system 300 corresponds to a different processing system that includes additional or fewer components than processing system 100. In the illustrated implementation, processing system 300 includes data management circuit 302, access control permissions 304, graph objects 306, access control vector lengths 308, and cache memory 118. Cache memory 118 includes cache lines 210, 216, and 222, which store respective graph object data 212, 218, and 224 and respective access control metadata 214, 220, and 226.

Data management circuit 302 (e.g., a processor such as processing circuit 104) receives access control permissions 304 (e.g., from an access control file), graph objects 306 (e.g., from a graph file), and access control vector lengths 308 (e.g., from a source an input file). Access control permissions 304 includes indications of which users, groups of users, clearance levels, or roles have permission to access graph objects 306. Graph objects 306 include graph object data, which in some implementations indicate an interaction or relationship between entities. In various implementations, the entities are humans in a social network or professional network, web objects on the internet, or consumer products in a recommendation system. Access control vector lengths 308 include an indication of a number of users, groups of users, clearance levels, or roles associated with access control permissions 304 and graph objects 306.

In response to receiving access control permissions 304, graph objects 306, and access control vector lengths 308, data management circuit 302 separates graph objects 306 and stores the graph objects at respective cache lines (e.g., cache lines 210, 216, and 222) of cache memory 118. Additionally, data management circuit 302 generates access control metadata that indicates access control permissions indicated by access control permissions 304 for each user, groups of user, clearance level, or role indicated by access control vector lengths 308. The access control metadata is separated based on corresponding graph objects and stored inline at respective cache lines (e.g., cache lines 210, 216, and 222) of cache memory 118. Subsequently, in response to receiving a request for a graph object (e.g., graph object data 218), corresponding access control metadata (e.g., access control metadata 220) is retrieved but excluding other access control metadata (e.g., access control metadata 214 and 226). As a result, access control metadata for the corresponding graph object is more easily retrieved and access permissions are more easily verified, as compared to a system where access control metadata is not stored inline with corresponding graph object data.

Figure 4:
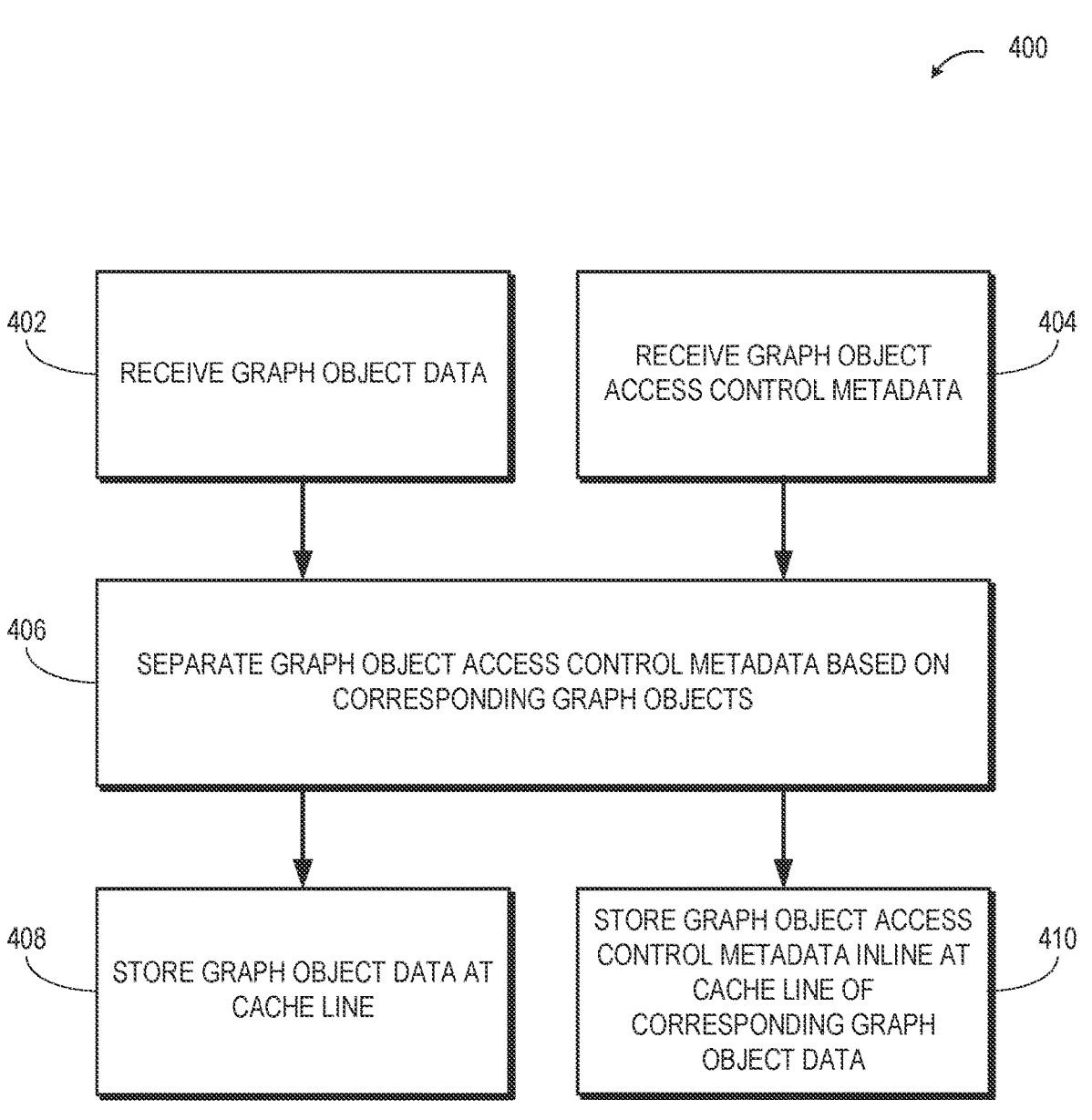
FIG. 4 is a flow diagram of a method of storing graph objects and associated access control metadata in accordance with some implementations.

FIG. 4 is a flow diagram illustrating a method 400 of storing graph objects and associated access control metadata in accordance with some implementations. In some implementations, method 400 is initiated by one or more processors in response to one or more instructions stored by a computer readable storage medium. In some implementations, some portions of method 400 are performed simultaneously, such as blocks 402 and 404 or blocks 408 and 410.

At block 402, graph object data is received. For example, data management circuit 302 receives graph objects 306 via a graph file. At block 404, graph object access control metadata is received. For example, data management circuit 302 receives access control permissions 304 via an access control file.

At block 406, the graph object access control metadata is separated based on corresponding graph objects. For example, data management circuit 302 separates access control permissions 304 based on corresponding graph objects of graph objects 306.

At block 408, the graph object data is stored at a cache line. For example, data management circuit 302 stores a portion of graph objects 306 corresponding to a single graph object at graph object data 212 of cache line 210. At block 410, graph object access control metadata is stored inline at a cache line of corresponding graph object data. For example, data management circuit 302 stores a portion of access control permissions 304 associated with the graph object data stored at graph object data 212 inline at access control metadata 214 of cache line 210. As another example, data management circuit 302 stores a portion of access control metadata generated based on access control permissions 304 and associated with the graph object data stored at graph object data 212 inline at access control metadata 214 of cache line 210. Accordingly, a method of generating and storing data integrity verification information is depicted.

In some implementations, various portions of method 400 are performed by multiple components in parallel. For example, in some implementations, block 402 is performed by processing circuits 104 and 106 on respective portions of graph objects 306 in parallel. In some implementations, method 400 is performed multiple times in parallel or sequentially.

Figure 5:
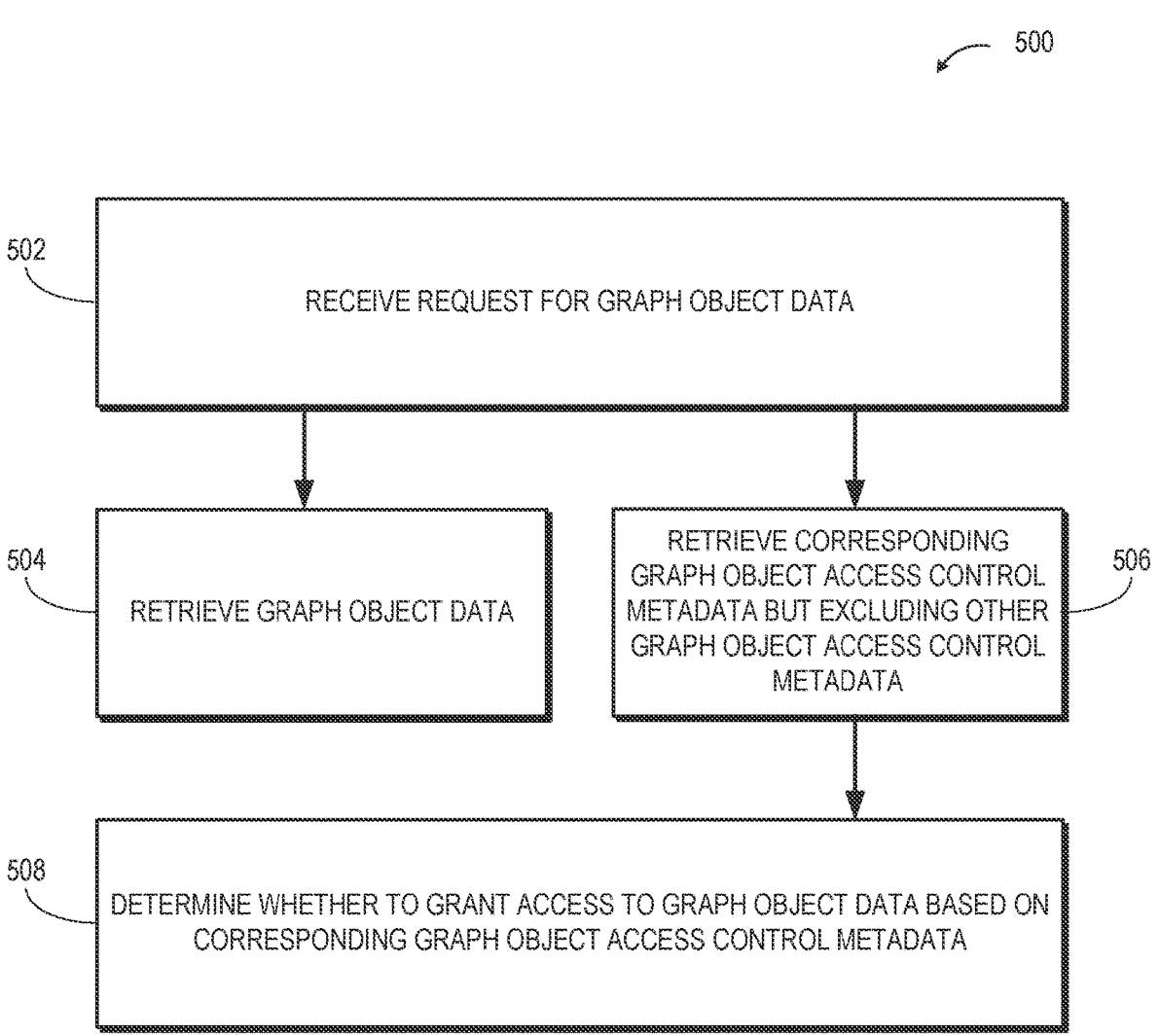
FIG. 5 is a flow diagram of a method of retrieving graph objects and verifying access permissions in accordance with some implementations.

FIG. 5 is a flow diagram illustrating a method 500 of retrieving graph objects and verifying access permissions in accordance with some implementations. In some implementations, method 500 is initiated by one or more processors in response to one or more instructions stored by a computer readable storage medium. In some implementations, some portions of method 500 are performed simultaneously, such as blocks 504 and 506 or blocks 504 and 508. In other implementations, portions of method 500 are performed sequentially in various orders. For example, in some implementations, block 504 is performed before block 506. In other implementations, block 504 is performed after block 508.

At block 502, a request for graph object data is received. For example, processing circuit 104 receives a request for graph object data 212 from a process associated with a user. At block 504, the graph object data is retrieved. For example, in response to the request for graph object data 212, processing circuit 104 retrieves graph object data 212 from cache line 216 of cache memory 118.

At block 506, corresponding graph object access control metadata is retrieved but excluding other graph object access control metadata. For example, in response to the request for graph object data 212, processing circuit 104 retrieves access control metadata 220 from cache line 216 but does excludes (e.g., does not retrieve, omits, or filters out) access control metadata 214 from cache line 210 and access control metadata 226 from cache line 222. At block 508, a determination is made whether to grant access to the graph object data based on the corresponding graph object access control metadata. For example, processing circuit 104 determines the user has permission to perform the requested access to graph object data 212 based on access permissions indicated in access control metadata 214 and grants access to graph object data 212. Accordingly, a method of retrieving graph objects and verifying access permissions is depicted.

As described above, in some implementations, the determination of whether to grant access to a graph object in block 508 is performed prior to retrieving the graph object data in block 504. In such implementations, data is not retrieved for a user that does not have permission to access that data. However, in cases where retrieving the graph object data is part of a critical path for a program, determining whether access is granted prior to retrieving the data slows down execution of the program, which is undesirable in some cases. As described above, in some implementations, at least a portion of retrieving the graph object data at block 504 is performed prior to or in parallel with at least a portion of the determination of block 508. In some implementations, block 504 is performed or initiated in response to a prediction that permission to access the graph object data will be granted. The prediction is performed in a manner similar to branch prediction by including an additional speculative access indication (e.g., a speculative access bit) that indicates that the prediction was speculatively performed. In response to access to the graph object data being subsequently denied, the processor raises an exception (e.g., a data exception) to prevent the requesting process from accessing the graph object data. For example, in response to the exception, a handler causes system software to take one of various actions such as alarming the user or forcing the requesting process to terminate. As a result of the speculative fetching, load-to-use latency is unaffected.

In some implementations, a computer readable storage medium includes any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), or Blu-Ray disc), magnetic media (e.g., floppy disk, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. In some implementations, the computer readable storage medium is embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some implementations, certain aspects of the techniques described above are implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. In some implementations, the executable instructions stored on the non-transitory computer readable storage medium are in source code, assembly language code, object code, or other instruction format that is interpreted or otherwise executable by one or more processors.

Note that not all of the activities or elements described above in the general description are required, that a portion of a specific activity or device are not required, and that, in some cases, one or more further activities are performed, or elements included, in addition to those described. Still further, the order in which activities are listed are not necessarily the order in which they are performed. Also, the concepts have been described with reference to specific implementations. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific implementations. However, the benefits, advantages, solutions to problems, and any feature(s) that cause any benefit, advantage, or solution to occur or become more pronounced are not to be construed as a critical, required, or essential feature of any or all the claims. Moreover, the particular implementations disclosed above are illustrative only, as the disclosed subject matter could be modified and practiced in different but equivalent manners apparent to those skilled in the art having the benefit of the teachings herein. No limitations are intended to the details of construction or design herein shown, other than as described in the claims below. It is therefore evident that the particular implementations disclosed above could be altered or modified and all such variations are considered within the scope of the disclosed subject matter. Accordingly, the protection sought herein is as set forth in the claims below.

Within this disclosure, in some cases, different entities (which are variously referred to as "components," "units," "devices," etc.) are described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "memory device configured to store data" is intended to cover, for example, an integrated circuit that has circuitry that stores data during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Further, the term "configured to" is not intended to mean "configurable to." An unprogrammed field programmable gate array, for example, would not be considered to be "configured to" perform some specific function, although it could be "configurable to" perform that function after programming. Additionally, reciting in the appended claims that a structure is "configured to" perform one or more tasks is expressly intended not to be interpreted as having means-plus-function elements.

What is claimed is:

1. A method, comprising:
receiving first metadata indicative of access control permissions to access a first graph object of a plurality of graph objects;
storing the first metadata and the first graph object inline at a cache line of a cache memory;
receiving a request to access the first graph object;
in response to the request, retrieving the first metadata but excluding metadata associated with other graph objects of the plurality of graph objects; and
granting access to the first graph object based on the first metadata.

2. The method of claim 1, wherein the first graph object shares a memory page with at least one of the other graph objects of the plurality of graph objects associated with metadata that is excluded.

3. The method of claim 1, wherein the access control permissions correspond to a clearance level of a group of users.

4. The method of claim 3, wherein a quantity of clearance levels including the clearance level is less than a quantity of the plurality of graph objects.

5. The method of claim 1, further comprising:
in response to the request to access the first graph object and prior to granting access to the first graph object, initiating retrieving the first graph object based on a speculative access indication.

6. The method of claim 5, wherein at least a portion of retrieving the first graph object is performed in parallel with at least a portion of granting access to the first graph object.

7. The method of claim 1, wherein the first graph object indicates an interaction or relationship between entities.

8. The method of claim 7, wherein the entities are humans in a social network, web objects on the internet, consumer products in a recommendation system, or any combination thereof.

9. An apparatus comprising:
a cache memory comprising a plurality of cache lines, comprising:
a first cache line configured to store a first graph object and first graph object metadata indicative of access control permissions associated with the first graph object; and
a second cache line configured to store a second graph object and second graph object metadata indicative of access control permissions associated with the second graph object; and
a processing circuit configured to retrieve the first graph object metadata but exclude the second graph object metadata in response to a request to access the first graph object but excluding the second graph object.

10. The apparatus of claim 9, wherein the processing circuit is further configured to:
receive the first graph object, the second graph object, the first graph object metadata, and the second graph object metadata; and
store the first graph object, the second graph object, the first graph object metadata, and the second graph object metadata at the cache memory.

11. The apparatus of claim 10, wherein the processing circuit is further configured to:
separate the first graph object and the first graph object metadata from the second graph object and the second graph object metadata prior to storing the first graph object, the second graph object, the first graph object metadata, and the second graph object metadata at the cache memory.

12. The apparatus of claim 11, wherein separating the first graph object and the first graph object metadata from the second graph object and the second graph object metadata comprises identifying that the first graph object metadata corresponds to the first graph object and that the second graph object metadata corresponds to the second graph object.

13. The apparatus of claim 9, wherein the processing circuit is further configured to:
predictively retrieve the first graph object prior to determining whether the request to access the first graph object has permission to access the first graph object.

14. The apparatus of claim 13, wherein the processing circuit is further configured to:

raise a data exception that prevents access to the first graph object based on determining not to grant access to the first graph object and subsequent to retrieving the first graph object.

15. The apparatus of claim 14, wherein the processing circuit is further configured to:

in response to raising the data exception, terminate a process associated with the request to access the first graph object.

16. A method, comprising:

storing first metadata inline at a first cache line of a cache memory with a first corresponding graph object, first metadata indicating whether a first account is to be permitted to access the first corresponding graph object; and storing second metadata inline at a second cache line of the cache memory with a second corresponding graph object, the second metadata indicating whether the first account is to be permitted to access the second corresponding graph object.

17. The method of claim 16, further comprising:

receiving metadata indicative of access control permissions to access corresponding graph objects; and separating the metadata based on the corresponding graph objects.

18. The method of claim 17, further comprising:

generating the first metadata based on the metadata indicative of access control permissions and based on an access control vector length that indicates a number of clearance levels of accounts.

19. The method of claim 18, wherein the first metadata further indicates whether a second account is to be permitted to access the first corresponding graph object, wherein the second account has a different clearance level than the first account.

20. The method of claim 16, further comprising:

storing third metadata inline at the first cache line, wherein the third metadata indicates whether the first account is to be permitted to access the first corresponding graph object, wherein the first metadata corresponds to read permissions and the third metadata corresponds to write permissions.

* * * * *